(12) United States Patent
Noll et al.

(10) Patent No.: US 6,581,626 B2
(45) Date of Patent: Jun. 24, 2003

(54) BACKFLOW PREVENTION APPARATUS

(75) Inventors: Brad L. Noll, Atascadero, CA (US); William M. Orr, Paso Robles, CA (US); Timothy W. Hurt, Paso Robles, CA (US)

(73) Assignee: Zurn Industries, Inc., Erie, PA (US)

( * ) Notice: Subject to any disclaimer, the term of this patent is extended or adjusted under 35 U.S.C. 154(b) by 50 days.

(21) Appl. No.: 09/894,915

(22) Filed: Jun. 28, 2001

(65) Prior Publication Data

US 2003/0000577 A1 Jan. 2, 2003

(51) Int. Cl.[7] .................................................. F61K 15/00
(52) U.S. Cl. ................ 137/315.11; 137/512; 137/454.2
(58) Field of Search ........................... 137/454.2, 454.6, 137/315.11, 315.33, 512, 218, 527, 535, 614.2, 614.21; 285/31

(56) References Cited

U.S. PATENT DOCUMENTS

| | | | |
|---|---|---|---|
| 3,747,621 A | 7/1973 | Tine | 137/218 |
| 4,284,097 A | 8/1981 | Becker et al. | 137/454.2 |
| 4,420,010 A | 12/1983 | Becker et al. | 137/116 |
| 4,893,654 A | 1/1990 | Feuz | 137/614.2 |
| 5,080,122 A | 1/1992 | Neuzeret | 137/15 |
| 5,148,828 A | 9/1992 | Farnham | 137/454.6 |
| 5,236,009 A | 8/1993 | Ackroyd | 137/454.2 |
| 5,387,017 A | 2/1995 | Gill | 285/322 |
| 5,584,315 A | 12/1996 | Powell | 137/454.2 |
| 5,715,857 A | 2/1998 | Gill | 137/219 |
| 6,021,805 A | 2/2000 | Horne et al. | 137/375 |
| 6,155,291 A | 12/2000 | Powell | 137/527.8 |
| 6,220,282 B1 | 4/2001 | Powell | 137/454.2 |
| 6,349,736 B1 * | 2/2002 | Dunmire | 137/15.19 |
| 6,443,181 B1 * | 9/2002 | Powell | 137/512 |

* cited by examiner

Primary Examiner—Michael Powell Buiz
Assistant Examiner—Ramesh Krishnamurthy
(74) Attorney, Agent, or Firm—Webb Ziesenheim Logsdon Orkin & Hanson, P.C.

(57) ABSTRACT

A backflow prevention apparatus has a housing with an opening having a predetermined length. A first valve body, and a second valve body may be slidably sealed with one another, and compressed such that their combined length is less then the length of the opening. In the compressed state the valve bodies may be inserted within the opening of the housing and then elongated such that the ends of valve bodies engage and sliding seal with segments of the housing. A spacer may be placed between the first valve body and the second valve body to secure them within the opening. An intermediate valve body may be introduced between the first valve body and the second valve body.

30 Claims, 8 Drawing Sheets

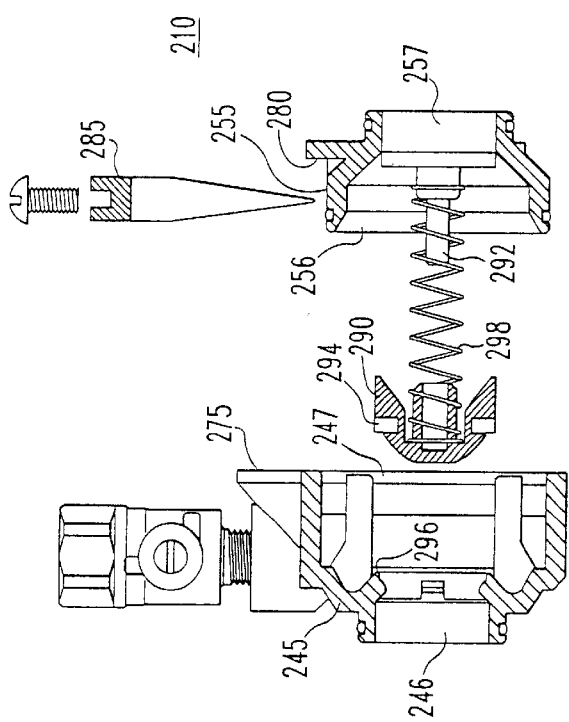
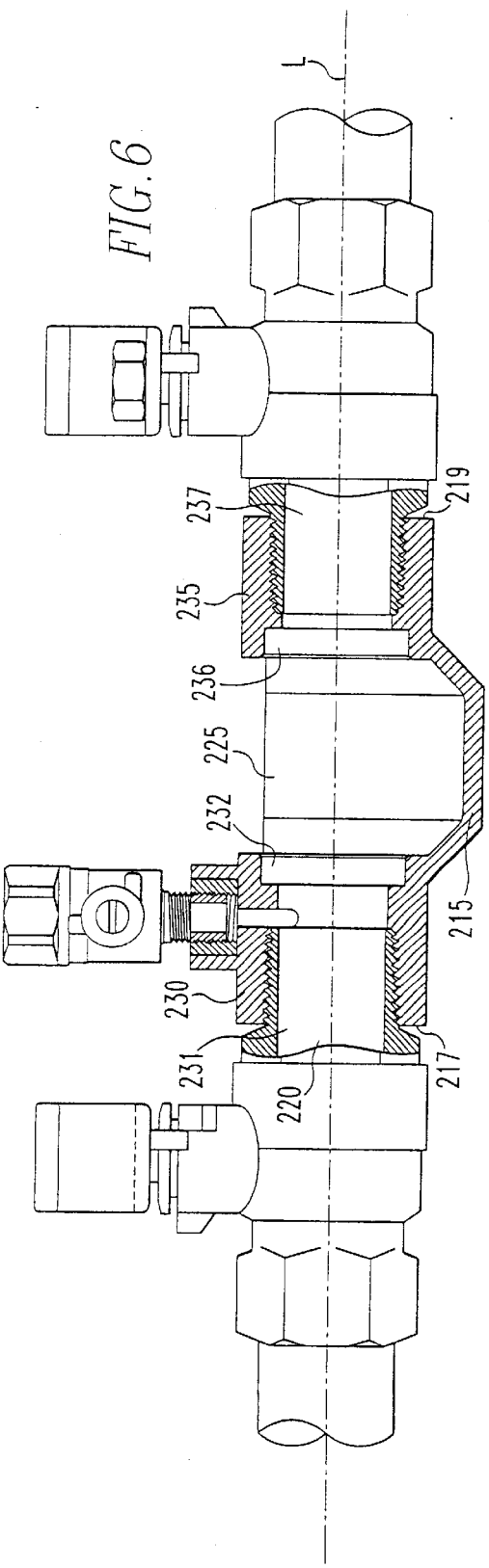
FIG. 6

BACKFLOW PREVENTION APPARATUS

BACKGROUND OF THE INVENTION

1. Field of the Invention

The invention relates to a backflow prevention apparatus and more particularly, to a backflow prevention apparatus having internal parts that may be removable as a unit through a lateral opening in the valve body.

2. Description of the Prior Art

Backflow prevention apparatuses are widely used to prevent undesirable flow reversal under low flow, static, back-siphonage or back pressure situations wherein clean upstream fluid sources can be contaminated by downstream fluid. Backflow prevention apparatuses typically are comprised of one or two check valves, housed within a valve housing, which undergo closure under backflow, back pressure or back siphonage conditions. The use of backflow prevention apparatus is generally required by law for cross-connected water supplies, wherein potable water could undergo contamination due to flow reversal or back pressure conditions.

Typically, in order to inspect or replace internal parts of a backflow prevention apparatus it is necessary to completely disassemble the apparatus. With current designs it may be necessary to manually remove a cover plate, thereby exposing the internal elements of the apparatus or, in the alternative, physically disconnecting the apparatus from the piping system in which it may be installed and then disassembling the apparatus. Frequently the inspection and/or repair of a backflow prevention apparatus must be done quickly and efficiently since the system to which the backflow prevention apparatus is associated must be shut down during such inspection and/or repair. Therefore, while the two designs just described may be disassembled for inspection and/or repair; however, such a process requires an inordinate amount of time.

A design for a backflow prevention apparatus is desired that would permit relatively quick and easy removal, inspection and if necessary, replacement of internal elements within the backflow prevention apparatus.

SUMMARY OF THE INVENTION

In one embodiment of the subject invention a backflow prevention apparatus is comprised of:
a) a housing having
   i) a front end;
   ii) a back end;
   iii) a bore extending therethrough along a longitudinal axis;
   iv) an opening extending laterally through the housing between the front end and the back end providing access to the bore, wherein the opening has a length along the longitudinal axis;
   v) a first segment at the front end of the housing and a second segment at the back end of the housing;
   vi) wherein the first segment has an inlet and an outlet; and
   vii) wherein the second segment has an inlet and an outlet;
b) a first valve body having an inlet and an outlet wherein the inlet of the first valve body may be slidably sealed with the outlet of the first segment;
c) a second valve body having an inlet and an outlet, wherein the inlet of the second valve body may be slidably sealed with the outlet of the first valve body and wherein the outlet of the second valve body may be slidably sealed with the inlet of the second segment;
d) wherein the first valve body and the second valve body are slidably positioned relative to one another within the opening such that;
   1) in an elongated position, the combined length along the longitudinal axis between the first valve body inlet and the second valve body outlet is greater than the longitudinal length of the opening, thereby securing the valve bodies within the opening and
   2) in a collapsed position, the combined longitudinal length is less than the longitudinal length of the opening, thereby making the valve bodies removable from within the opening.

In a second embodiment of the subject invention a backflow prevention apparatus is comprised of:
a) a housing having
   i) a front end;
   ii) a back end;
   iii) a bore extending therethrough along a longitudinal axis;
   iv) an opening extending laterally through the housing between the front end and the back end providing access to the bore, wherein the opening has a length along the longitudinal axis;
   v) a first segment at the front end of the housing and a second segment at the back end of the housing;
   vi) wherein the first segment has an inlet and an outlet; and
   vii) wherein the second segment has an inlet and an outlet;
b) a first valve body having an inlet and an outlet wherein the inlet of the first valve body may be slidably sealed with the outlet of the first segment;
c) an intermediate valve body having an inlet and an outlet wherein the inlet of the intermediate body may be slidably sealed with outlet of the first valve body;
d) a second valve body having an inlet and an outlet and a length therebetween, wherein the inlet of the second valve body may be slidably sealed with the outlet of the intermediate body and wherein the outlet of the second valve body may be slidably sealed with the inlet of the second segment; and
e) wherein the first valve body, the intermediate valve body and the second valve body are slidably positioned relative to one another within the opening such that
   1) in an elongated position, the combined length along the longitudinal axis between the first valve body inlet and the second valve body outlet is greater than the longitudinal length of the opening, thereby securing the first valve body, the intermediate valve body and the second valve body with a water-tight seal within the opening and
   2) in a collapsed position, the combined length along the longitudinal axis between the first valve body inlet and the second valve body outlet is less than the longitudinal length of the opening, thereby making the first valve body, the intermediate valve body and the second valve body removable from within the opening.

The subject invention is also directed to a method for assembling a backflow prevention apparatus, wherein the apparatus has a) a housing having
   i) a front end;
   ii) a back end;
   iii) a bore extending therethrough along a longitudinal axis;
   iv) an opening extending laterally through the housing between the front end and the back end providing access to the bore, wherein the opening has a length along the longitudinal axis;
   v) a first segment at the front end of the housing and a second segment at the back end of the opening;
   vi) wherein the first segment has an inlet and an outlet; and
   vii) wherein the second segment has an inlet and an outlet;
b) a first valve body having an inlet and an outlet wherein the inlet of the first valve body may be slidably sealed with the outlet of the first segment;
c) a second valve body having an inlet and an outlet wherein the inlet of the second valve body may be slidably sealed with the outlet of the first valve body and wherein the outlet of the second valve body may be slidably sealed with the inlet of the second segment, wherein the method comprises the steps of:
   A) sliding the first valve body and the second valve body together until their combined length is less than the length of the opening thereby defining a collapsed unit;
   B) positioning the collapsed unit within the housing through the opening of the housing; and
   C) elongating the collapsed unit until the inlet of the first valve body engages and is slidingly sealed with the outlet side of the first segment and until the outlet of the second valve body engages and is slidingly sealed with the inlet of the second segment, thereby defining an elongated unit having a sealed bore extending through the first segment, the first valve body, the second valve body and the second segment.

The subject invention additionally is directed to a method for assembling a backflow prevention apparatus, wherein the apparatus has
a) a housing having
   i) a front end;
   ii) a back end;
   iii) a bore extending therethrough along a longitudinal axis;
   iv) an opening extending laterally through the housing between the front end and the back end providing access to the bore, wherein the opening has a length along the longitudinal axis;
   v) a first segment at the front end of the housing and a second segment at the back end of the opening;
   vi) wherein the first segment has an inlet and an outlet; and
   vii) wherein the second segment has an inlet and an outlet;
b) a first valve body having an inlet and an outlet wherein the inlet of the first valve body is slidably sealed with the outlet of the first segment;
c) an intermediate valve body having an inlet and an outlet wherein the inlet of the intermediate body is slidably sealed with the outlet of the first valve body; and
d) a second valve body having an inlet and an outlet wherein the inlet of the second valve body is slidably sealed with the outlet of the intermediate body and wherein the outlet of the second valve body is slidably sealed with the inlet of the second segment; wherein the method comprises the steps of:
   A) sliding the first valve body, the intermediate valve body and the second valve body together until their combined length is less than the length of the opening thereby defining a collapsed unit;
   B) positioning the collapsed unit within the housing through the opening of the housing; and
   C) elongating the collapsed unit until the inlet of the first valve body engages and is slidingly sealed with the outlet side of the first segment and until the outlet of the second valve body engages and is slidingly sealed with the inlet of the second segment, thereby defining an elongated unit having a sealed bore extending through the first segment, the first valve body, the intermediate valve body, the second valve body and the second segment.

BRIEF DESCRIPTION OF THE DRAWINGS

FIG. 6 illustrates an exploded sectional side view of a backflow prevention apparatus having two valve bodies and a single poppet check valve;

DETAILED DESCRIPTION OF THE INVENTION

Figure 1:
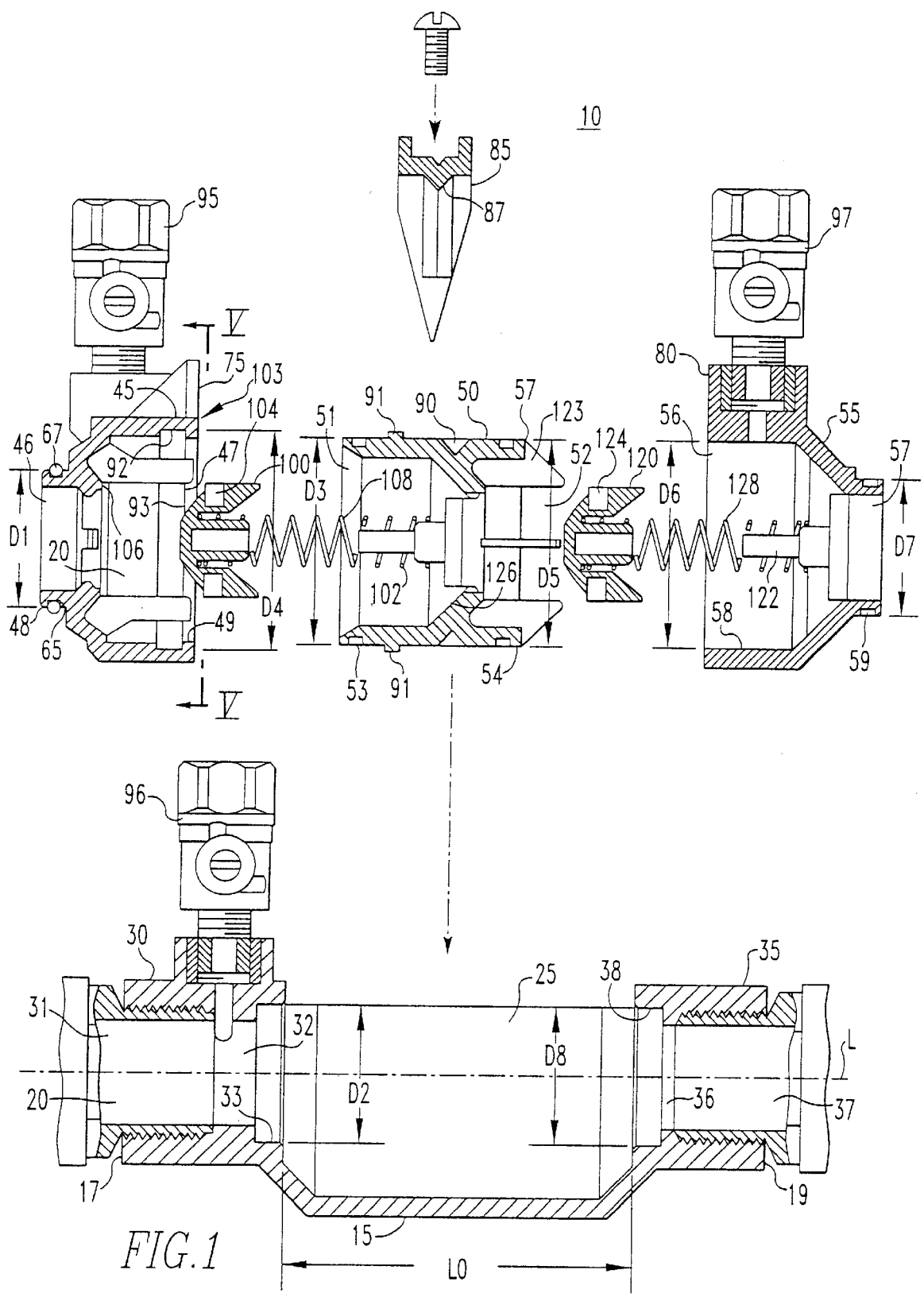
FIG. 1 illustrates an exploded sectional side view of a backflow prevention apparatus having three valve bodies and two poppet-type check valves.

FIG. 1 illustrates a backflow prevention apparatus 10 comprising a housing 15 with a front end 17 and a back end 19, with a bore 20 extending through the housing 15 along a longitudinal axis L. An opening 25 extends laterally through the housing 15 between the front end 17 and the back end 19 providing access to the bore 20. The opening 25 has a length LO along the longitudinal axis L.

A first segment 30 at the front end 17 of the housing 15 has an inlet 31 and an outlet 32. A second segment 35 at the back end 19 of the housing 15 has an inlet 36 and an outlet 37. A first valve body 45 has an inlet 46 and an outlet 47.

Figure 4:
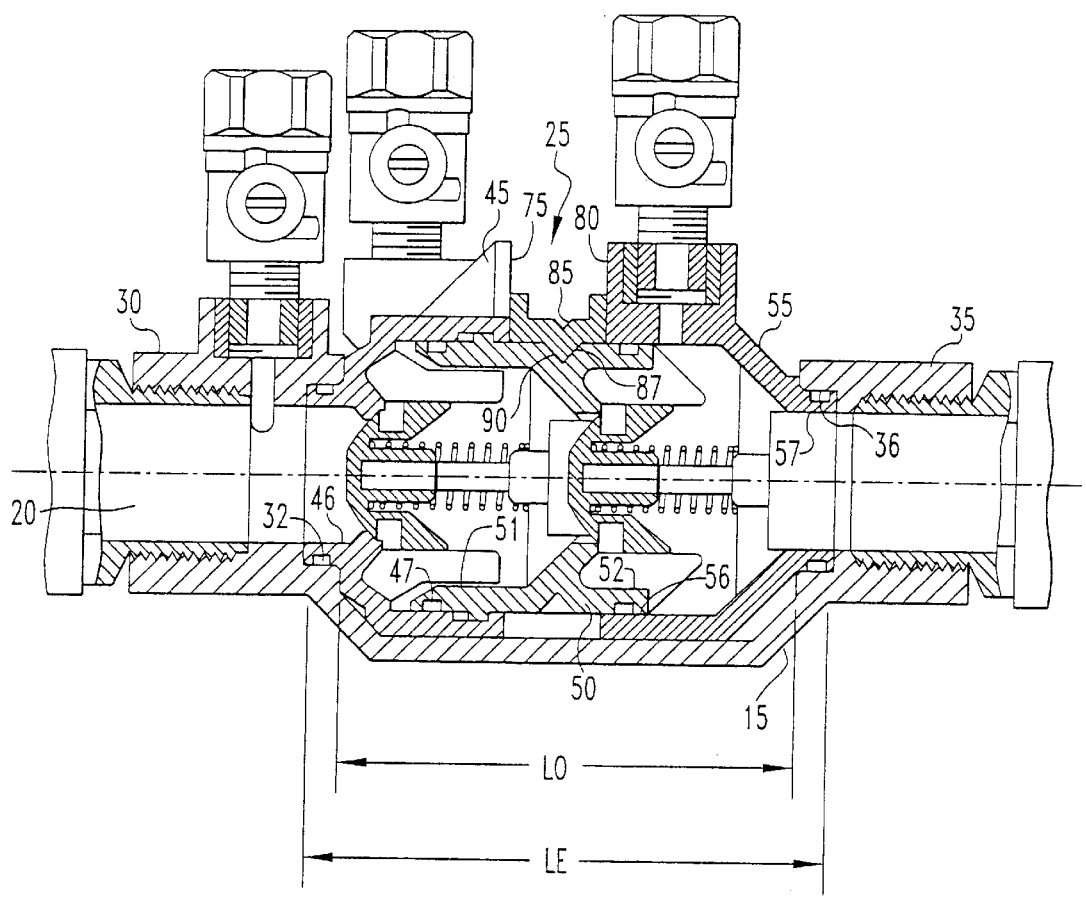
FIG. 4 illustrates the embodiment in FIG. 1, wherein the valve bodies are in an elongated position.

As illustrated in FIG. 4 the inlet 46 of the first valve body 45 is slidably sealed with the outlet 32 of the first segment 30.

Returning to FIG. 1 an intermediate valve body 50 has an inlet 51 and an outlet 52.

As illustrated in FIG. 4 the inlet 51 of the intermediate valve body 50 may be slidably sealed within the outlet 47 of the first valve body 45.

Returning to FIG. 1 a second valve body 55 has an inlet 56 and an outlet 57.

For convenience, the bore 20 will be discussed as the passageway extending along the entire length of the housing 15 through the first valve body 45, the intermediate valve body 50 and the second valve body 55.

Directing attention to FIG. 4 the inlet 56 of the second valve body 55 is slidably sealed with the outlet 52 of the intermediate body 50. Furthermore, the outlet 57 of the second valve body 55 may be slidably sealed within the inlet 36 of the second segment 35.

The first valve body 45, the intermediate valve body 50 and the second valve body 55 are slidably positioned relative to one another along the longitudinal axis L such that in an elongated position, as illustrated in FIG. 4, the elongated length LE along the longitudinal axis L between the inlet 46 of the first valve body 45 and the outlet 57 of the second valve body 55 is greater than the longitudinal length LO of the opening 25. As illustrated in FIG. 4, in an elongated position the first valve body 45, the intermediate valve body 50 and the second valve body 55 are secured within the opening 25 of the housing 15.

Figure 2:
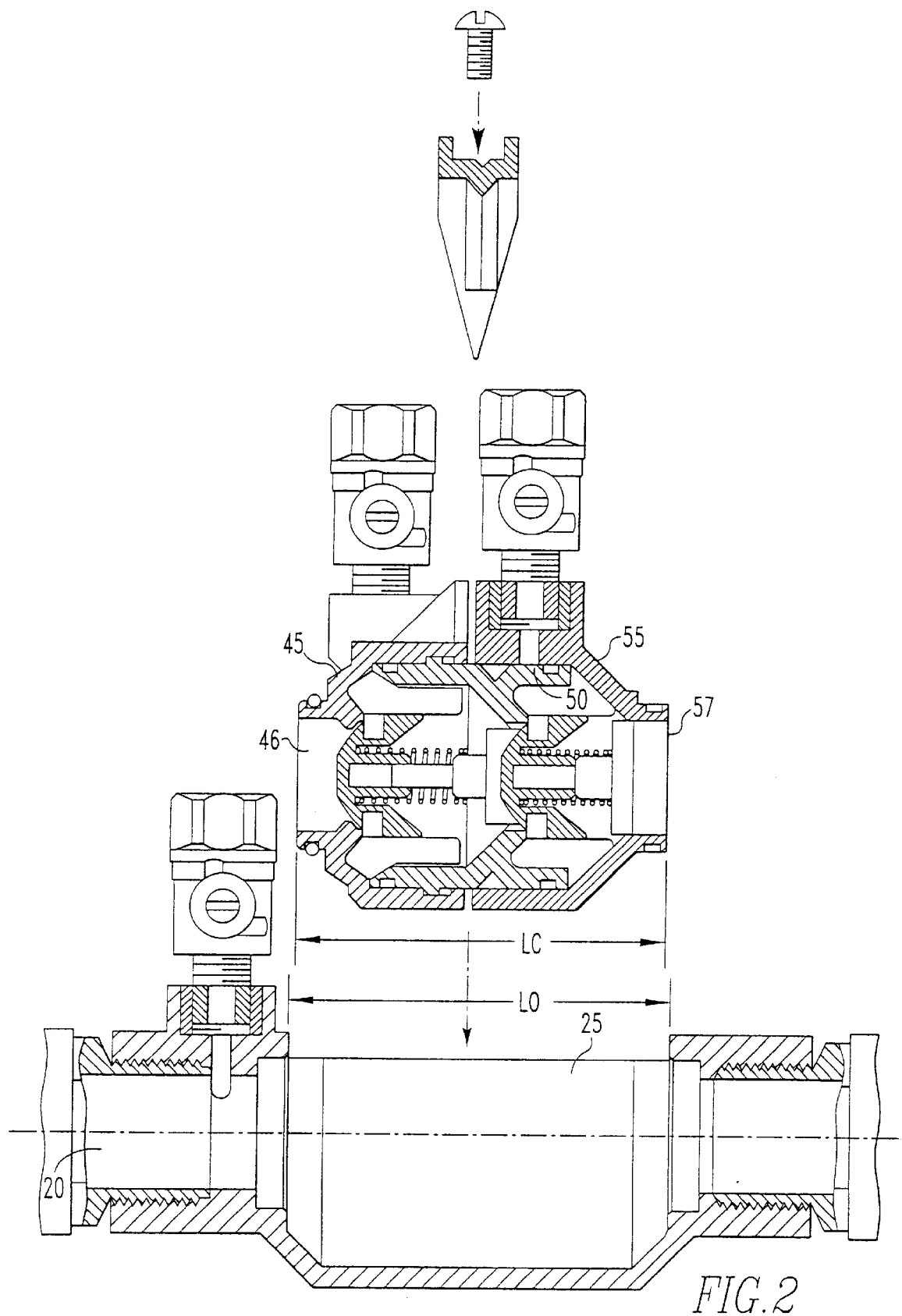
FIG. 2 illustrates the embodiment in FIG. 1, wherein the valve bodies are in a collapsed position.
Figure 3:
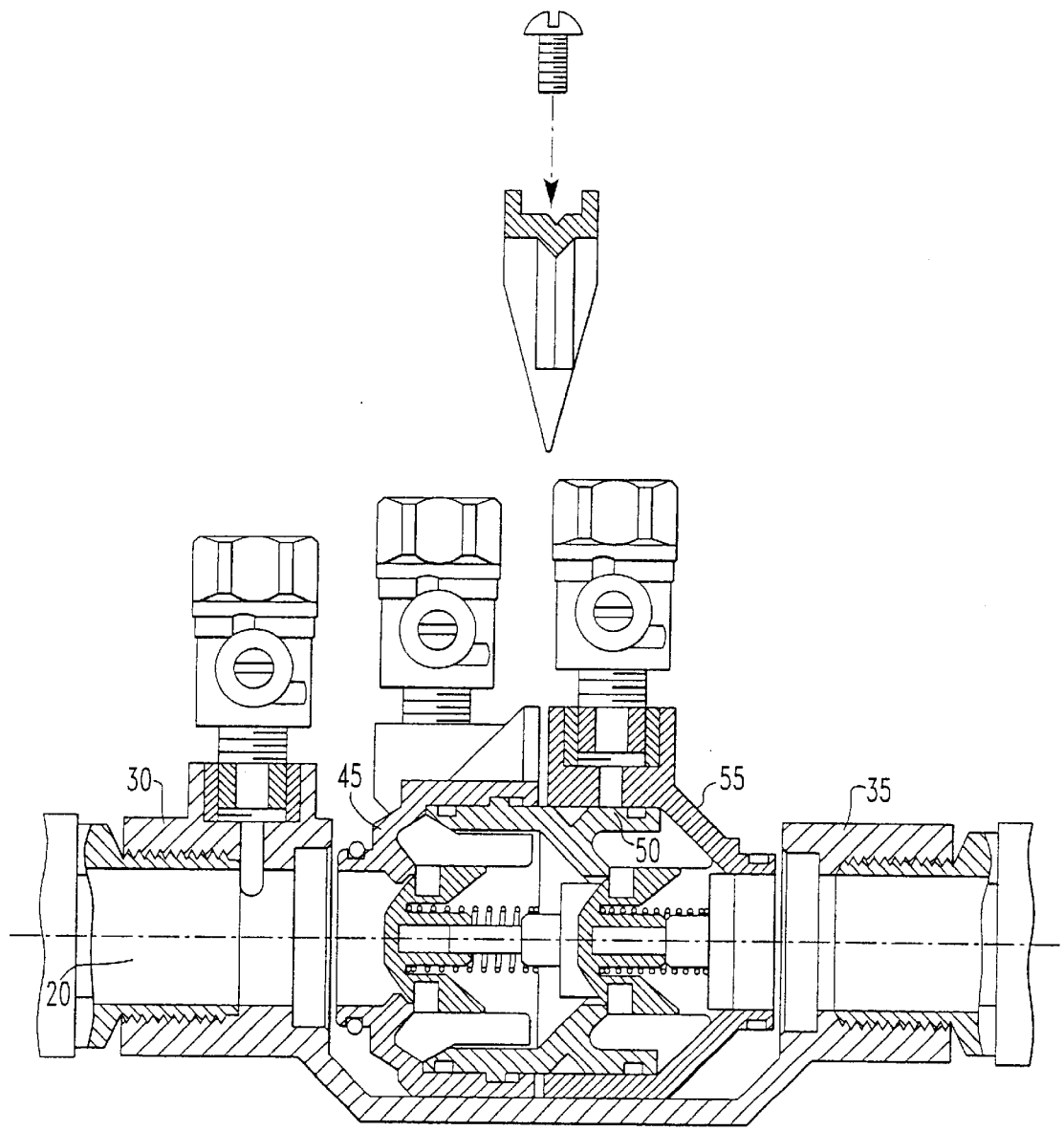
FIG. 3 illustrates the embodiment in FIG. 1, wherein the valve bodies are position within the opening of the valve housing.

Directing attention to FIG. 2, the first valve body 45, the intermediate valve body 50 and the second valve body 55 may be collapsed together such that the collapsed length LC along the longitudinal axis L between the first valve body inlet 46 and the second valve body outlet 57 is less than the longitudinal length LO of the opening 25, thereby making the collapsed unit comprised of the valve bodies 45, 50 and 55 removable from within the opening 25. FIG. 3 illustrates the valve bodies 45, 50, 55 as a collapsed unit positioned within the opening 25 along the longitudinal axis L.

Directing attention to FIG. 1, the first segment 30, the first valve body 45, the intermediate valve body 50, the second valve body 55 and the second segment 35 are slidably sealed to form a seal throughout the bore 20 along the entire length of the housing 15 in the following manner. The inlet 46 of the first valve body 45 has an inlet 46 with a portion 48 with an outer diameter D1 which fits within a portion 33 in the first segment 30 having an inner diameter D2 to provide a slideable seal between the first segment 30 and the first valve body 45.

The inlet 51 of the intermediate valve body 50 has an inlet portion 53 with outer diameter D3 which fits within portion 49 of outlet 47 and has an inner diameter D4 to provide a slideable seal between the first valve body 45 and the intermediate valve body 50.

The outlet 52 of the intermediate valve body 50 has a portion 54 having an outside diameter D5 which fits within portion 58 of the inlet 56 of the second valve body 55 having an inner diameter D6 to provide a slideable seal between the intermediate valve body 50 and the second valve body 55.

Finally, the second valve body 55 has outlet 57 with a portion 59 which has an outer diameter D7 which fits within portion 38 at the inlet 36 of the second segment 35 having an inner diameter D8 to provide a slideable seal between the second valve body 55 and the second segment 35.

To enhance the efficiency of the slidable seal between the segments and valve bodies, one of the mating slidable sealed inner diameter portions and outer diameter portion (for example, first valve body 45) may have a recess 65 with a seal 67, such as an O-ring, to promote sealing and to permit longitudinal motion between the first valve body 45 and the first segment 30. However, it should be appreciated that such an arrangement may be applicable to provide an efficient slideable seal between each of the first segment 30, second segment 35, first valve body 45, intermediate valve body 50 and second valve body 55. The seal 67 may be an O-ring or any other suitable seal that would provide relative motion between two parts while at the same time retaining a watertight seal.

To retain the first valve body 45, intermediate valve body 50 and second valve body 55 in the proper position in the opening 25, the first valve body 45 has a shoulder 75 which faces an opposing shoulder 80 on the second valve body 55. As illustrated in FIG. 4, a spacer 85 is positioned between the shoulder 75 and the shoulder 80 to maintain the valve bodies 45, 55 in the elongated position within the housing 15.

It should be apparent that each pair of mating parts may have an end portion with an outer diameter which fits within the inner diameter portion of an adjacent part. As an example, first segment 30 may have an outlet portion with an outer diameter which fits within a portion at the inlet of the first valve body having an approximately equal inner diameter. This alternative arrangement may apply to any or all of the other mating portions.

To maintain the intermediate valve body 50 in a predetermined position relative to the first valve body 45 and the second valve body 55, the intermediate valve body 50 may have an indentation 90 (FIG. 1) and the spacer 85 may have a mating projection 87 which engages the indentation 90, thereby positioning the intermediate valve body 55 at a known longitudinal location relative to the first valve body 45 and second valve body 55. Additionally the spacer 85 has a wedge shape to promote separation of the first valve body 45 from the second valve body 50 when the spacer 85 is inserted between the bodies 45,55.

When installing the first valve body 45, the intermediate valve body 50, and the second valve body 55 within the housing 15, it is possible to compress the three bodies simultaneously to form the collapsed unit. However, when poppet-type valves, such as those illustrated in FIGS. 1–4 are used, this collapsed unit, which is urged apart by springs associated with each poppet, may come apart.

Figure 5:
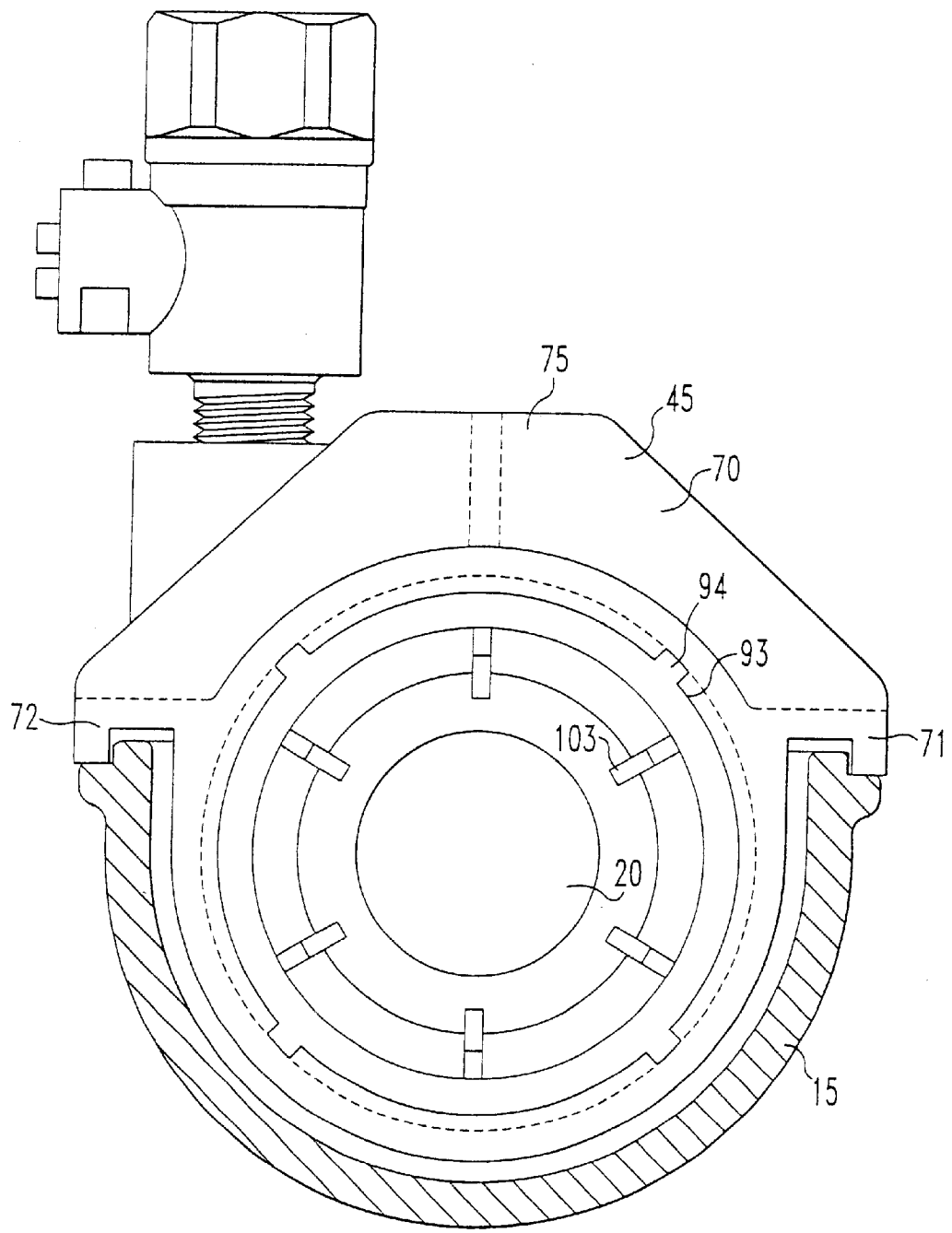
FIG. 5 illustrates an end view of the first valve body along arrows V—V in FIG. 1.

Therefore, at least one valve body may be secured to an adjacent valve body prior to installing the collapsed unit into the opening 25. FIG. 1 illustrates such an embodiment using retention nubs 91 on the intermediate body 50. The retention nubs 91 are receivable into a retention groove 92 adjacent to the outlet 47 of the first valve body 45. The retention groove 92 has a shoulder 93 and the retention nubs 91 may be aligned with slots 94 (FIG. 5) extending through the shoulder 93. The first valve body 45 and the intermediate valve body 50 may be compressed together until the retention nubs 91 are inserted into the retention groove 92 past the shoulder 93. Once the retention nubs 91 are inserted past the shoulder 93, the intermediate valve body 50 may be rotated relative to the first valve body 45 such that the nubs 91 are not aligned with the slots 94 but are retained by the shoulder 93 within the groove 92.

First valve body 45 and second valve body 55 are each designed to cover the opening 25 of the housing 15 when, together with the spacer 85, they are in an elongated position. Directing attention to FIG. 5, the first valve body 45 has an integral cover 70 formed by upper portions 71, 72 which extend along the length of and straddle the valve body 45 to seal the opening 25. This cover 70 may serve three functions. First, the cover 70 prevents the valve body 45 from rotating. Second, the cover 70 positions the valve body parts in their proper radial location relative to the longitudinal axis L. This permits the valve body 45 to be mated using minimal force with the housing 15. Third, the cover 70, in conjunction with the spacer 85 and the second valve body 55—which has a similar integral cover, keep dirt and debris from between the valve bodies 45, 50, 55 and housing 15.

What has so far been discussed is a first valve body 45, an intermediate valve body 50 and a second valve body 55, which in a collapsed position may fit within the opening 25 of a housing 15 and in the elongated position will be slidingly sealed and engaged within the first segment 30 and second segment 35 of the housing 15.

As will now be discussed, different valve components may be attached to each of the valve bodies 45, 50, 55. With reference to FIG. 1, a first valve poppet 100 may be slidingly mounted upon a poppet guide 102 secured within the bore 20, extending through the intermediate valve body 50. The poppet 100 has a poppet seal 104 which may be urged against the seal face 106 in the bore 20 extending through the first valve body 45. The poppet 100 may be radially supported within the first valve body 45 by vanes 103 (FIG. 5 also) extending radially from the first valve body 45 into the bore 20. A spring 108 may be used to urge the poppet 100 against the seal face 106. The spring 108 may be sized to determine the fluid pressure which will displace the poppet 100 sufficiently to permit passage of fluid past the poppet 100.

A second poppet 120 may be slidably positioned upon a guide 122 mounted to the second valve body 55, such that the seal 124 on the poppet 120 acts against the seal face 126 positioned on the intermediate valve body 50. The poppet 120 may be radially supported within the intermediate valve body 50 by vanes 123 extending radially from the intermediate valve body 50 into the bore 20. A spring 128 urges the poppet 120 against the seal face 126 and, just as before, the spring may be sized to determine the fluid pressure to permit fluid past the poppet 120. Therefore, FIGS. 1–4 show valve bodies 45,50,55 suitable to house hardware for two poppet-type backflow prevention valves, wherein the two spring loaded poppets 100,120 are secured to the valve bodies and each poppet is urged to seal the bore extending through the valve bodies.

It should be noted that the poppet guide 102,122 may be secured directly to the respective poppet 100,120 and the guide 102,122 would be slidingly mounted by a support within the respective valve body 50, 55.

Figure 8:
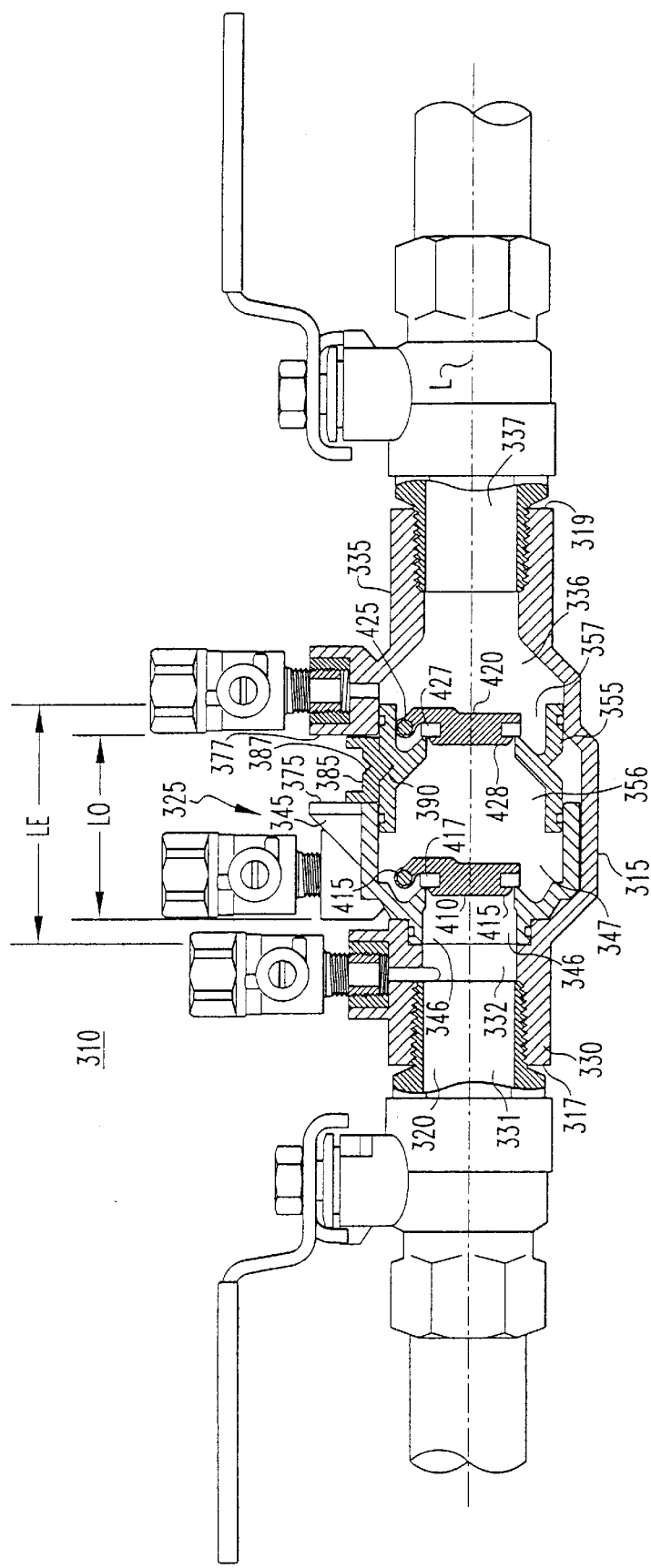
FIG. 8 illustrates a sectional side view of a backflow prevention apparatus having two valve bodies and two clapper-type check valves.

It should be appreciated that while poppet-type backflow prevention valves have been discussed, as illustrated in FIG. 8 it is entirely possible to include clapper type valves within one or both of the first valve body 45, the intermediate valve body 50 or the second valve body 55.

So far the discussion has been focused upon a backflow prevention apparatus having three valve bodies which as a unit may be inserted and secured within the opening of a housing or may be collapsed and removed from or positioned within the opening of a housing. It is also possible to utilize fewer valve bodies for the fabrication of a backflow prevention apparatus having either a single check valve or a double check valve.

Figure 7:
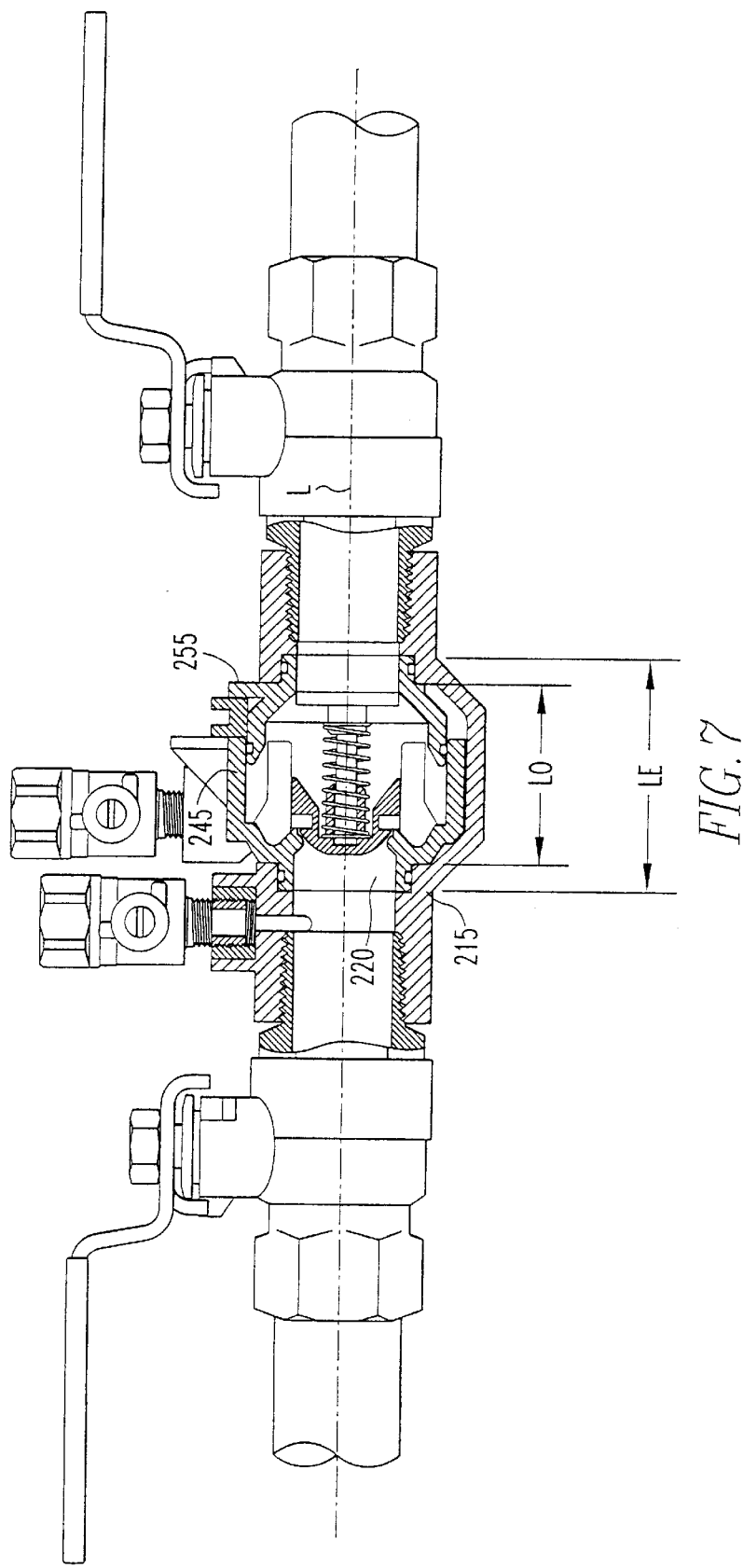
FIG. 7 illustrates the embodiment in FIG. 6, wherein the valve bodies are in an elongated position.

Directing attention to FIGS. 6 and 7 a backflow prevention apparatus 210 has a housing 215 with a front end 217 and a back end 219. A bore 220 extends through the length of the housing 215. An opening 225 extends laterally through the housing 215. A first segment 230 has an inlet 231 and an outlet 232. The housing 215 has a second segment 235 having an inlet 236 and an outlet 237.

A first valve body 245 has an inlet 246 and an outlet 247 wherein the inlet 246 of the first valve body 245 is slidably sealed with the outlet 232 of the first segment 230.

A second valve body 255 has an inlet 256 and an outlet 257. The inlet 256 of the second valve body 255 is slidably sealed with the outlet 247 of the first valve body 245. Furthermore, the outlet 257 of the second valve body 255 may be slidably sealed with the inlet 236 of the second segment 235.

The first valve body 245 and the second valve body 255 are slidably positioned relative to one another within the opening 225, such that, in the elongated position, illustrated in FIG. 7, the combined length LE along the longitudinal axis L between the first valve body inlet 246 and the second valve body outlet 257 is greater than the longitudinal length LO of the opening 225, thereby securing the valve bodies within the opening 225. Furthermore, in a collapsed position the combined longitudinal length, which is not shown but is similar to the collapsed arrangement illustrated in FIG. 2, is less than the longitudinal length LO of the opening, thereby making the valve bodies removable from or insertable within the opening 225.

The manner of establishing a slideable seal between the first segment 230, the first valve body 245, the second valve body 255 and the second segment 235 is identical to that previously discussed, and therefore such a discussion will not be repeated.

Returning to FIG. 6, the first valve body 245 has a shoulder 275 which faces an opposing shoulder 280 on the second valve body 255. In the elongated position a spacer 285 is positioned between the opposing shoulders 275,280 to maintain the valve bodies 245,255 in the elongated position within the housing 215.

The backflow prevention apparatus 210, illustrated in FIGS. 6 and 7, illustrates a single poppet-type backflow prevention valve comprised of a poppet 290 slidably mounted upon a guide 292. Secured to the poppet 290 is a seal 294, which acts against a seal face 296 to seal the bore 220. The poppet 290 is urged against the seal face 296 by a spring 298 which biases the poppet 290 against the seal face 296. The spring 298 may be selected based upon the desired fluid pressure required to displace the poppet 290 from the seal face 296 to permit fluid past the poppet 290.

Although FIGS. 6 and 7 illustrate only a single check valve within the confines of first valve body 245 and second valve body 255 it is entirely possible for two separate check valves to exist within these valve bodies.

FIG. 8 illustrates another embodiment of a backflow prevention apparatus 310 having a housing 315 with a front end 317 and a back end 319. A bore 320 extends through the housing along a longitudinal axis L. An opening 325 extends laterally through the housing 315 between the front end 317 and the back end 319 of the housing 315. The opening 325 has a length LO along the longitudinal axis L. A first segment 330 has an inlet 331 and an outlet 332, wherein a second segment 335 has an inlet 336 and an outlet 337.

A first valve body 345 has an inlet 346 and an outlet 347, wherein the inlet 346 of the first valve body 345 is slidably sealed within the outlet 332 of the first segment 330.

A second valve body 355 has an inlet 356 and an outlet 357, wherein the inlet 356 of the second valve body 355 is slidably sealed within the outlet 347 of the first valve body 345 and, wherein the outlet 357 of the second valve body 355 may be slidably sealed within the inlet 336 of the second segment 335.

Just as in prior embodiments in an elongated position, the combined length LE along the longitudinal axis L between the first valve body inlet 346 and the second valve body outlet 357 is greater than the longitudinal length LO of the opening 325, thereby securing the valve bodies 345,355 within the opening 325. Furthermore, the first valve body 345 and the second valve body 355 are slidably positioned relative to one another within the opening 325, such that, in a collapsed position (not shown) the combined longitudinal length is less the longitudinal length LO of the opening 325, thereby making the valve bodies 345,355 removable from within the opening 325.

The manner in which the first segment 330, the first valve body 345, the second valve body 355 and the second segment 335 are slidably sealed to provide a sealed bore 320 along the length of the housing is similar to that manner previously discussed in the other embodiments and, therefore, such a discussion will not be repeated.

The first valve body 345 has a shoulder 375 which faces an opposing shoulder 377 on the second segment 335. A spacer 385 is positioned between the opposing shoulders 375,377 to maintain the valve bodies in an elongated position. The second valve body 355 may have an indentation 390, and the spacer 385 may have a projection 387 such that the spacer 385 may simultaneously space the first valve body 345 and secure the second valve body 355 in a fixed position relative to the first valve body 345.

FIG. 8 illustrates a first clapper valve 410 and a second clapper valve 420 mounted within the bore 320 of the housing 315 and secured to the first valve body 345 and the second valve body 355 respectively. Each of these clapper valves 410,420 swings about a pivot 415,425, which may be secured to the first valve body 345 and the second valve body 355 respectively. Just as with the poppet-type valves previously discussed, each clapper valve 410,420 has a seal 417,427 which act against seal face 418,428 located within the first valve body 345 and second valve body 355 respectively. While these clapper valves may be maintained in the closed position as illustrated in FIG. 8 by gravity, it is more typical that such clapper valves are spring loaded, such the that pressure required to open the clapper valves may be determined by the size of the spring.

Just as the backflow prevention apparatus 310, illustrated in FIG. 8 may house two clapper-type valves, it may also house two poppet-type valves in a manner similar to that previously discussed.

Furthermore, poppet-type valves and clapper-type valve have been associated with the valve bodies discussed herein. It should be appreciated that other types of valves, including a reduced pressure principle double check valve with an integral relief valve, may be associated with the valve bodies of the subject invention.

Bleed valves 95,96,97 (FIG. 1) are positioned at various points along each backflow prevention apparatus discussed herein to provide access points for bleeding air from the backflow prevention apparatus, testing, and for relieving pressure in selected portions of the apparatus when necessary to dissemble the apparatus.

The invention has been described with reference to the preferred embodiments. Obvious modifications and alterations will occur to others upon reading and understanding the proceeding detailed description. It is intended that the invention be construed as including all such modifications and alterations insofar as they come within the scope of appended claims or the equivalents thereof.

I claim:

1. A backflow prevention apparatus, comprising:
   a) a housing having
      i) a front end;
      ii) a back end;
      iii) a bore extending therethrough along a longitudinal axis;
      iv) an opening extending laterally through the housing between the front end and the back end providing access to the bore, wherein the opening has a length along the longitudinal axis;
      v) a first segment at the front end of the housing and a second segment at the back end of the housing;
      vi) wherein the first segment has an inlet and an outlet; and
      vii) wherein the second segment has an inlet and an outlet;
   b) a first valve body having an inlet and an outlet, wherein the inlet of the first valve body may be slidably sealed with the outlet of the first segment;
   c) a second valve body having an inlet and an outlet, wherein the inlet of the second valve body may be slidably sealed with the outlet of the first valve body and wherein the outlet of the second valve body may be slidably sealed with the inlet of the second segment;
   d) wherein the first valve body and the second valve body are slidably positioned relative to one another within the opening such that;
      1) in an elongated position, the combined length along the longitudinal axis between the first valve body inlet and the second valve body outlet is greater than the longitudinal length of the opening, thereby securing with a watertight seal the valve bodies within the opening and
      2) in a collapsed position, the combined length is less than the longitudinal length of the opening, thereby making the valve bodies removable from within the opening.

2. The apparatus according to claim 1 wherein
   a) one of the outlet of the first segment or the inlet of the first valve body has an outer diameter portion which fits within an inner diameter portion of the other of the outlet of the first segment or the inlet of the first valve body to provide a slidable seal;
   b) one of the outlet of the first valve body or the inlet of the second valve body has an outer diameter portion which fits within an inner diameter portion of the other of the outlet of the first valve body or the inlet of the second valve body to provide a slidable seal; and
   c) one of the outlet of the second valve body or the inlet of the second segment has an outer diameter portion which fits within an inner diameter portion of the other of the outlet of the second valve body or the inlet of the second segment to provide a slidable seal.

3. The apparatus according to claim 2 wherein one of the mating slidably sealed inner diameter portions and outer diameter portions has a circumferential recess with a seal positioned therein to promote sealing and to permit longitudinal motion between the valve bodies and segments.

4. The apparatus according to claim 2 wherein each of the first valve body and the second valve body has an integral valve cover which together enclose and seal the opening in the housing.

5. The apparatus according to claim 1 wherein the first valve body has a shoulder which faces an opposing shoulder on the second valve body and wherein the apparatus further includes a spacer, wherein in the elongated position the spacer is positioned between the opposing shoulders to maintain the valve bodies in the elongated position within the housing.

6. The apparatus according to claim 5 wherein the second valve body has one of an indentation or projection and the spacer has the other of an indentation or projection such that the spacer may simultaneously space the first valve body and the second valve body from each other.

7. The apparatus according to claim 5 wherein the spacer has a wedge shape to urge apart the first valve body and the second valve body when the spacer is positioned between them.

8. The apparatus according to claim 1 wherein one or both of the valve bodies house hardware for a poppet-type backflow prevention valve.

9. The apparatus according to claim 8 wherein a spring loaded poppet is secured to one of the valve bodies and is urged to seal the bore through the other valve body.

10. The apparatus according to claim 9 wherein the spring loaded poppet is guided by one of the valve bodies and wherein the guide is oriented longitudinally within the bore.

11. The apparatus according to claim 1 wherein one or both of the valve bodies house the hardware for a clapper valve.

12. The apparatus according to claim 1 wherein the valve bodies house hardware for two poppet-type backflow prevention valves.

13. The apparatus according to claim 12 wherein two spring loaded poppets are secured to the valve bodies and each poppet is urged to seal the bore through one of the valve bodies.

14. The apparatus according to claim 13 wherein each spring loaded poppet is guided by one of the valve bodies and oriented longitudinally within the bore.

15. The apparatus according to claim 1 wherein one or both of the valve bodies house the hardware for two clapper valves.

16. A backflow prevention apparatus, comprising:
a) a housing having
   i) a front end;
   ii) a back end;
   iii) a bore extending therethrough along a longitudinal axis;
   iv) an opening extending laterally through the housing between the front end and the back end providing access to the bore, wherein the opening has a length along the longitudinal axis;
   v) a first segment at the front end of the housing and a second segment at the back end of the housing;
   vi) wherein the first segment has an inlet and an outlet; and
   vii) wherein the second segment has an inlet and an outlet;
b) a first valve body having an inlet and an outlet, wherein the inlet of the first valve body may be slidably sealed with the outlet of the first segment;
c) an intermediate valve body having an inlet and an outlet, wherein the inlet of the intermediate body may be slidably sealed with outlet of the first valve body;
d) a second valve body having an inlet and an outlet, wherein the inlet of the second valve body may be slidably sealed with the outlet of the intermediate body and wherein the outlet of the second valve body may be slidably sealed with the inlet of the second segment; and
e) wherein the first valve body, the intermediate valve body and the second valve body are slidably positioned relative to one another within the opening such that
   1) in an elongated position, the combined length along the longitudinal axis between the first valve body inlet and the second valve body outlet is greater than the longitudinal length of the opening, thereby securing the first valve body, the intermediate valve body and the second valve body with a watertight seal within the opening and
   2) in a collapsed position, the combined length along the longitudinal axis between the first valve body inlet and the second valve body outlet is less than the longitudinal length of the opening, thereby making the first valve body, the intermediate valve body and the second valve body removable from within the opening.

17. The apparatus according to claim 16 wherein
a) one of the outlet of the first segment or the inlet of the first valve body has an outer diameter portion which fits within an inner diameter portion of the other of the outlet of the first segment or the inlet of the first valve body to provide a slidable seal;
b) one of the outlet of the first valve body or the inlet of the intermediate valve body has an outer diameter portion which fits within an inner diameter portion of the other of the outlet of the first valve body or the inlet of the intermediate valve body to provide a slidable seal;
c) one of the outlet of the intermediate valve body or the inlet of the second valve body has an outer diameter portion which fits within an inner diameter portion of the other of the outlet of the outlet of the intermediate valve body or the inlet of the second valve body to provide a slidable seal; and
d) one of the outlet of the second valve body or the inlet of the second segment has an outer diameter portion which fits within an inner diameter portion of the other of the outlet of the second valve body or the inlet of the second segment to provide a slidable seal.

18. The apparatus according to claim 17 wherein one of the mating slidably sealed inner diameter portions and outer diameter portions has a recess with a seal to promote sealing and to permit longitudinal motion between the valve bodies and segments.

19. The apparatus according to claim 17 wherein each of the first valve body and the second valve body has an integral valve cover which together enclose and seal the opening in the housing.

20. The apparatus according to claim 16 wherein the first valve body has a shoulder which faces an opposing shoulder on the second valve body and wherein the apparatus further includes a spacer, wherein in the elongated position the spacer is positioned between the opposing shoulders to maintain the valve bodies in the elongated position within the housing.

21. The apparatus according to claim 20 wherein the intermediate valve body has one of an indentation or projection and the spacer has the other of an indentation or projection such that the spacer may simultaneously space the first valve body and the second valve body from each other and secure the intermediate valve body in a fixed position relative the first and second valve bodies.

22. The apparatus according to claim 20 wherein the spacer has a wedge shape to urge apart the first valve body and the second valve body when the spacer is positioned between them.

23. The apparatus according to claim 16 wherein the valve bodies house hardware for two poppet-type backflow prevention valves.

24. The apparatus according to claim 23 wherein two spring loaded poppets are secured to the valve bodies and each poppet is urged to seal the bore of one of the valve bodies.

25. The apparatus according to claim 24 wherein each spring loaded poppet is guided by one of the valve bodies and oriented longitudinally within the bore.

26. The apparatus according to claim 16 wherein one or both of the valve bodies house the hardware for a clapper check valve.

27. A method for assembling a backflow prevention apparatus, wherein the apparatus has
   a) a housing having
      i) a front end;
      ii) a back end;
      iii) a bore extending therethrough along a longitudinal axis;
      iv) an opening extending laterally through the housing between the front end and the back end providing access to the bore, wherein the opening has a length along the longitudinal axis;
      v) a first segment at the front end of the housing and a second segment at the back end of the opening;
      vi) wherein the first segment has an inlet and an outlet; and
      vii) wherein the second segment has an inlet and an outlet;
   b) a first valve body having an inlet and an outlet, wherein the inlet of the first valve body may be slidably sealed with the outlet of the first segment;
   c) a second valve body having an inlet and an outlet, wherein the inlet of the second valve body may be slidably sealed with the outlet of the first valve body and wherein the outlet of the second valve body may be slidably sealed with the inlet of the second segment, wherein the method comprises the steps of:
      A) sliding the first valve body and the second valve body together until their combined length is less than the length of the opening thereby defining a collapsed unit;
      B) positioning the collapsed unit within the housing through the opening of the housing; and
      C) elongating the collapsed unit until the inlet of the first valve body engages and is slidingly sealed with the outlet side of the first segment and until the outlet of the second valve body engages and is slidingly sealed with the inlet of the second segment, thereby defining an elongated unit having a watertight sealed bore extending through the first segment, the first valve body, the second valve body and the second segment.

28. The method according to claim 27 wherein a spacer is inserted between opposing shoulders on the first valve body and the second valve body to maintain the first valve body and the second valve body as an elongated unit.

29. A method for assembling a backflow prevention apparatus, wherein the apparatus has
   a) a housing having
      i) a front end;
      ii) a back end;
      iii) a bore extending therethrough along a longitudinal axis;
      iv) an opening extending laterally through the housing between the front end and the back end providing access to the bore, wherein the opening has a length along the longitudinal axis;
      v) a first segment at the front end of the housing and a second segment at the back end of the opening;
      vi) wherein the first segment has an inlet and an outlet; and
      vii) wherein the second segment has an inlet and an outlet;
   b) a first valve body having an inlet and an outlet, wherein the inlet of the first valve body is slidably sealed with the outlet of the first segment;
   c) an intermediate valve body having an inlet and an outlet, wherein the inlet of the intermediate body is slidably sealed with the outlet of the first valve body; and
   d) a second valve body having an inlet and an outlet, wherein the inlet of the second valve body is slidably sealed with the outlet of the intermediate body and wherein the outlet of the second valve body is slidably sealed with the inlet of the second segment; wherein the method comprises the steps of:
      A) sliding the first valve body, the intermediate valve body and the second valve body together until their combined length is less than the length of the opening thereby defining a collapsed unit;
      B) positioning the collapsed unit within the housing through the opening of the housing; and
      C) elongating the collapsed unit until the inlet of the first valve body engages and is slidingly sealed with the outlet side of the first segment and until the outlet of the second valve body engages and is slidingly sealed with the inlet of the second segment, thereby defining an elongated unit having a watertight sealed bore extending through the first segment, the first valve body, the intermediate valve body, the second valve body and the second segment.

30. The method according to claim 29 wherein a spacer is inserted between opposing shoulders on the first valve body and the second valve body to retain relative positions of the first valve body and the second valve body as an elongated unit.

* * * * *

UNITED STATES PATENT AND TRADEMARK OFFICE
CERTIFICATE OF CORRECTION

PATENT NO. : 6,581,626 B2  
DATED : June 24, 2003  
INVENTOR(S) : Brad L. Noll et al.

It is certified that error appears in the above-identified patent and that said Letters Patent is hereby corrected as shown below:

<u>Title page</u>,  
Item [57], ABSTRACT,  
Line 5, "then" should read -- than --.  
Line 8, "sliding" should read -- slidingly --.

<u>Column 1</u>,  
Line 19, "backflow" should read -- a backflow --.  
Line 37, "repair; however" should read -- repair, however --.

<u>Column 2</u>,  
Line 41, "outlet" should read -- the outlet --.

<u>Column 9</u>,  
Line 3, "less the" should read -- less than the --.  
Line 28, "act" should read -- acts --.  
Line 40, "valve" should read -- valves --.

<u>Column 11</u>,  
Line 51, "with outlet" should read -- with the outlet --.

<u>Column 12</u>,  
Line 23, "of the outlet of the outlet" should read -- of the outlet --.  
Line 53, "relative the" should read -- relative to the --.

Signed and Sealed this

Eighth Day of June, 2004

JON W. DUDAS  
*Acting Director of the United States Patent and Trademark Office*